INVENTOR.
ROGER B. STONE
BY Anthony D. Cennamo
ATTORNEY

INVENTOR.
ROGER B. STONE

BY

Anthony D. Cennamo

ATTORNEY

May 5, 1970 R. B. STONE 3,510,585

MULTI-LEVEL DATA ENCODER-DECODER WITH PSEUDO-RANDOM TEST PATTERN GENERATION CAPABILITY

Filed Feb. 2, 1967 3 Sheets-Sheet 3

INVENTOR.
ROGER B. STONE

BY [signature]

ATTORNEY

United States Patent Office 3,510,585

Patented May 5, 1970

3,510,585

MULTI-LEVEL DATA ENCODER-DECODER WITH PSEUDO-RANDOM TEST PATTERN GENERATION CAPABILITY

Roger B. Stone, Webster, N.Y., assignor to Xerox Corporation, Rochester, N.Y., a corporation of New York Filed Feb. 2, 1967, Ser. No. 613,571
Int. Cl. H04l 27/10
U.S. Cl. 178—66 3 Claims

ABSTRACT OF THE DISCLOSURE

An encoder-decoder circuit for use in converting binary signals into multi-level signals and vice-versa for transmission of data through a restricted bandwidth information channel. Two level binary signals are converted to four level signals by means of logic circuitry designed for combined encoding and decoding operations. An additional feature of the encoding-decoding circuitry is the conversion thereof into a pseudo-random pattern generator for generation of a test pattern in order to test the encoding and decoding operations by means of a fixed transmitted pattern.

BACKGROUND

Transmission of information signals in a facsimile or other type of system may be accomplished, for example, over any of the known transmission media, such as telephone lines, microwave installations and direct wire. At a receiving location the information modulated signals must be demodulated and detected in order to obtain the original transmitted information. Typical modulating techniques include amplitude modulation, phase modulation, frequency modulation and so on.

In the frequency modulating technique known as frequency shift keying, data transmission is accomplished by assigning a different carrier frequency to each state of the data, i.e., mark and space, and transmitting the appropriate frequency for a period of time sufficient to assure reliable detection. The technique may be extended to include frequency transmission of data information with more than the normal two level mark and space frequencies. That is, in a multi-level data transmission system employing frequency shift keying, a plurality of frequencies would be transmitted, one frequency for each level in the data waveform.

In order to transmit a multi-level data signal, an encoding circuit must be utilized for converting the input binary information into the multi-level signals. The multi-level output from the encoding circuit would then be utilized to energize any of the known modulating circuits foı transmission to a receiving location. Demodulation of the transmitted modulated information must then take place at such a receiving location to recover the multi-level signals for application to a decoding circuit. Such a decoding circuit would then convert the multi-level information back to the original binary information waveform for application to any utilization device.

Prior art encoding and decoding systems have utilized separate circuits for the different functions. Such circuits have application to separate transmitting and receiving units but unnecessarily add to the expense and complexity of supplying such circuits as distinct encoding and decoding circuits are necessary if one particular location is to provide transmitting and receiving service. Additionally, it is often desired to permit testing of the transmitting and receiving units prior to transmission of information in order that system operation be monitored as functionally operable. The addition of a separate pattern generator, while useful, does not provide for maximum efficiency and minimum cost when such factors are important.

OBJECTS

It is, accordingly, an object of the present invention to provide an improved information encoder-decoder.

It is another object of the present invention to improve the performance of a data transmission system utilizing frequency shift keying.

It is another object of the present invention to provide encoding and decoding of binary to multi-level information by utilizing a dual function circuit.

It is another object of the present invention to provide a pseudo-random pattern generator in conjunction with an encoding-decoding circuit for use in an information transmission system employing a transceiver communications unit.

BRIEF SUMMARY OF THE INVENTION

In accomplishing the above and other desired aspects, applicant has invented novel apparatus for effectively encoding binary to multi-level and decoding multi-level to binary information in a frequency shift keyed transmission system. The invention utilizes a shift register and associated logic circuitry with a dual function. In the transmit mode input groups of binary information are shifted into the shift register and examined for the four possible combinations of two binary digits, commonly termed di-bits. A signal is then generated on one of four output lines depending upon the particular di-bit detected in the shift register. When properly switched, the shift register and associated circuitry in the receive mode are utilized to examine the input information to determine which di-bit is being presented and converting such di-bit information back to the original binary information. Thus, by proper application of the circuit, the encoding and decoding functions are performed. In addition, by the proper enabling of the various logic circuitry within the encoding and decoding circuitry, a random pattern is generated on the encoded data output lines for use in transmitting a test pattern utilized for testing purposes.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

A two level signal can be converted into a four level signal by taking the incoming bits two at a time and assigning each one of the four possible bit pairs, commonly called di-bits, to a different transmission signal. In FM, for instance, to a di-bit combination of 00 might be assigned the signaling frequency 1350 c.p.s., the di-bit combination 01 to 1650 c.p.s., the di-bit combination 10 to 1950 c.p.s., and the di-bit combination 11 to 2250 c.p.s. At the receiving location the frequency spectrum of the incoming signal must examined and the spectrum divided into regions. At each timing interval a decision must be made as to which frequency was transmitted and a di-bit inserted into the outgoing data stream. For instance, if the incoming frequency is between 1500 and 1800 c.p.s., a 01 di-bit will be placed in the data stream; while, if the frequency is detected to be between 1800 and 2100 c.p.s., a 10 di-bit will be detected. It is noted that in the above example an error in detection, which caused the adjacent region to be chosen, might cause an error of two bits in the output data. Another and possibly better assignment of di-bits would be one usually referred to as a Gray code, in which adjacent regions are assigned to di-bits which differ by only one binary digit.

It can be seen that the converting from a two level binary signal at a particular transition rate to a four level signal at one-half the previous transition rate, tends to concentrate the spectral energy of the signal at lower frequencies, which would allow a particular bit rate to be sent in a much narrower bandwidth channel. Thus, by using such a technique, twice the bit rate can be sent in a given channel with, however, reduction in noise immunity.

Figures 1A, 1B:
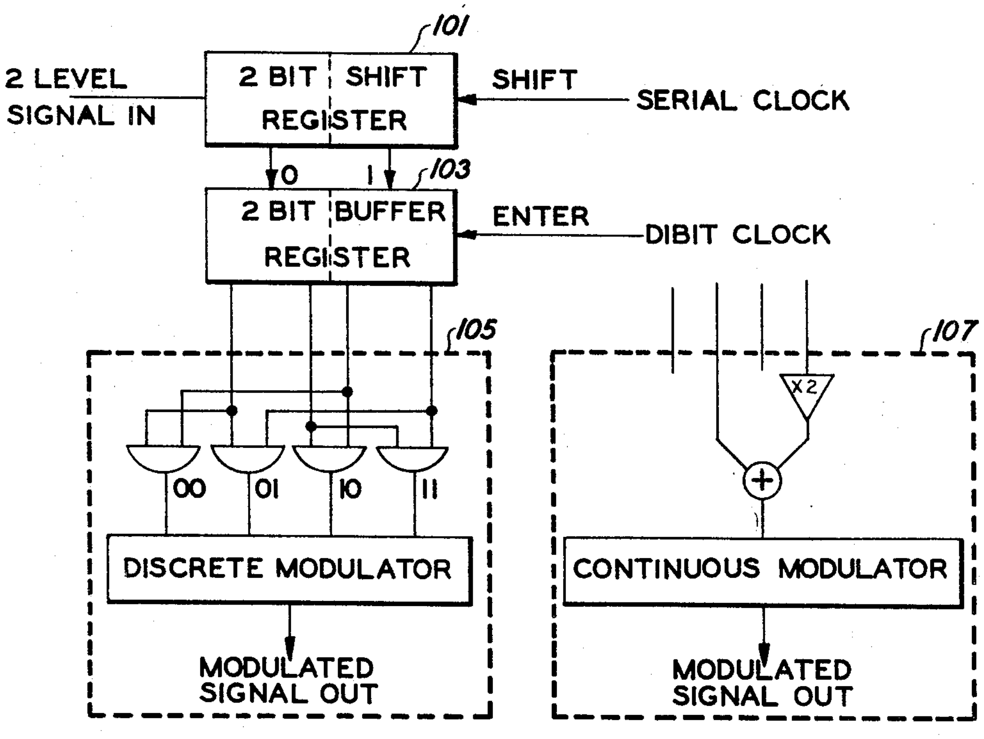
FIGS. 1A and 1B are diagrams of alternative encoding circuitry utilized in an information transmitter in accordance with the principles of the present invention.

Referring now to FIG. 1, there is shown a block diagram of alternative circuits utilized in the present invention. The incoming binary or two level signal is shifted into shift register 101. After every second shift by the serial clock, by a source not shown, the contents of shift register 101 are transferred into buffer register 103. The buffer register thus contains the most recent di-bit received from the binary data source. Depending upon the type of modulator to be used, different operations are performed on the contents of the buffer register. If the modulator is a discrete type wherein each transmitted signal is controlled by an individual control signal, as hereinafter more fully described, the circuit in FIG. 1A is utilized. If, however, the modulator is a continuous type where a single control signal is used and the transmitted symbol is a function of the voltage of that signal, that is, in amplitude, frequency, etc., depending upon the type modulation used, the technique as shown in FIG. 1B is utilized.

In the latter instance, therefore, the voltage on the 1 output of each flip-flop in the buffer register 103 is to be one volt when the flip-flop is set and 0 volts when it is reset, then the voltage at the input to the modulator in FIG. 1B will be 0, 1, 2, or 3 volts, corresponding to the state of the buffer register 103. This would cause a true or one condition to exist at the gate output labeled 00, 01, 10, or 11, respectively, in the discrete technique shown in FIG. 1A. A code converter would normally be attached to the output of the buffer register 103 to convert to a Gray code. In this way, therefore, the same system could easily be converted to generate any desired number of levels from a two level binary signal input.

Figure 2:
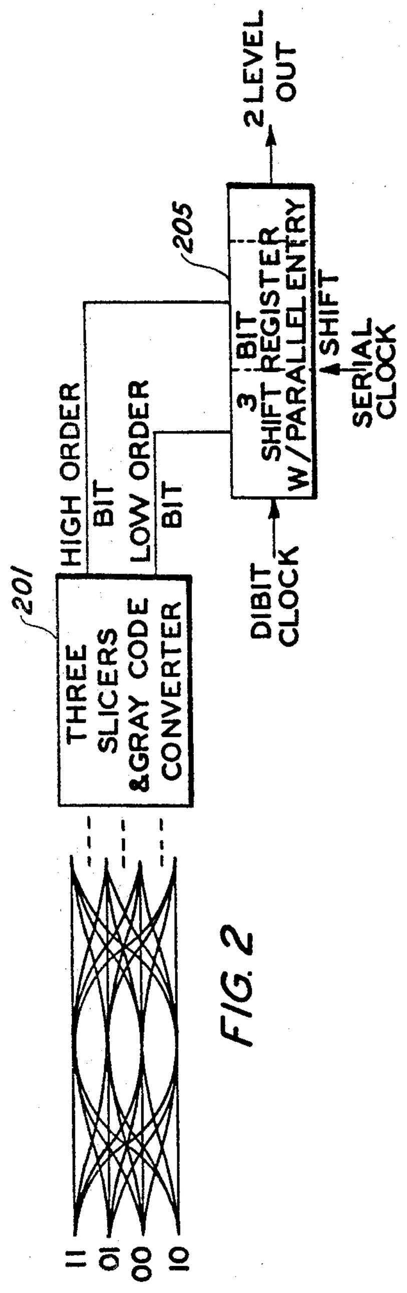
FIG. 2 is a block diagram of the decoding circuitry utilized in an information receiver in accordance with the principles of the present invention.
Figure 3:
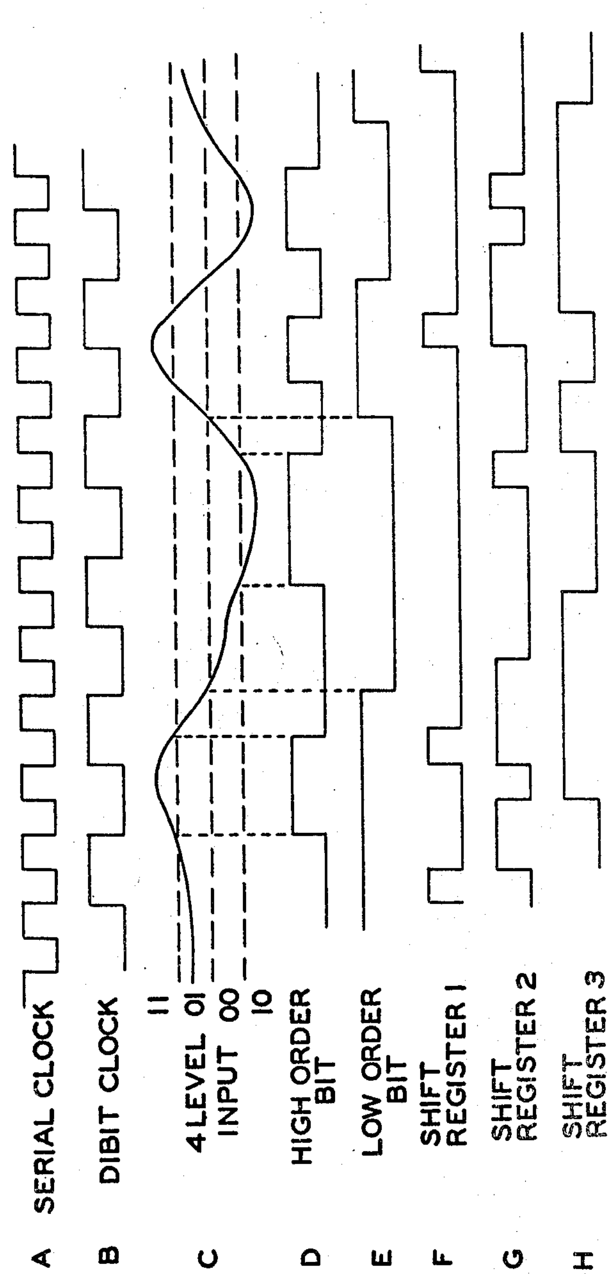
FIG. 3 shows various waveforms helpful in understanding the block diagram in FIG. 2.

In FIG. 2 is a block diagram of a four level to two level decoder. Three slicing circuits 201 divide the demodulator output signal space, which is represented by the familiar eye pattern in FIG. 2, into four regions. Logic circuits connected to the slicer outputs convert the slicer decisions into the proper di-bit assignment. The di-bit clock shown in FIG. 3B, samples the output of the logic circuits once each baud time and transfers the di-bit into the shift register 205. The serial clock, shown in FIG. 3A, is then utilized to shift the shift register. FIG. 3C indicates a representative waveform as applied to the slicer 201. The high order bit, shown in FIG. 3D, is applied to the second stage of shift register 205, while the low order bit, shown in FIG. 3E is applied to the first stage of the shift register 205. Since the serial clock runs at twice the rate of the di-bit clock, the previous di-bit is cleared out of the left-most two stages of the shift register before the next di-bit is entered. The third stage of the shift register 205 is necessary only if the data user does not intend to sample the output data. It is shown in order to illustrate that the original data can be accurately reconstituted. The outputs of the three stages of the shift register 205 are shown in FIGS. 3F, 3G, and 3H, respectively.

The binary data source may be any primary source of information which produces a series of binary pulses originally in or converted from analog to digital form. Such a source could be, for example, the output from an electronic computer, or a facsimile scanning system. The information may be compressed or uncompressed depending upon the economic efficiencies and capabilities of the system, as by any of the bandwidth compression techniques known in the art.

Figure 4:
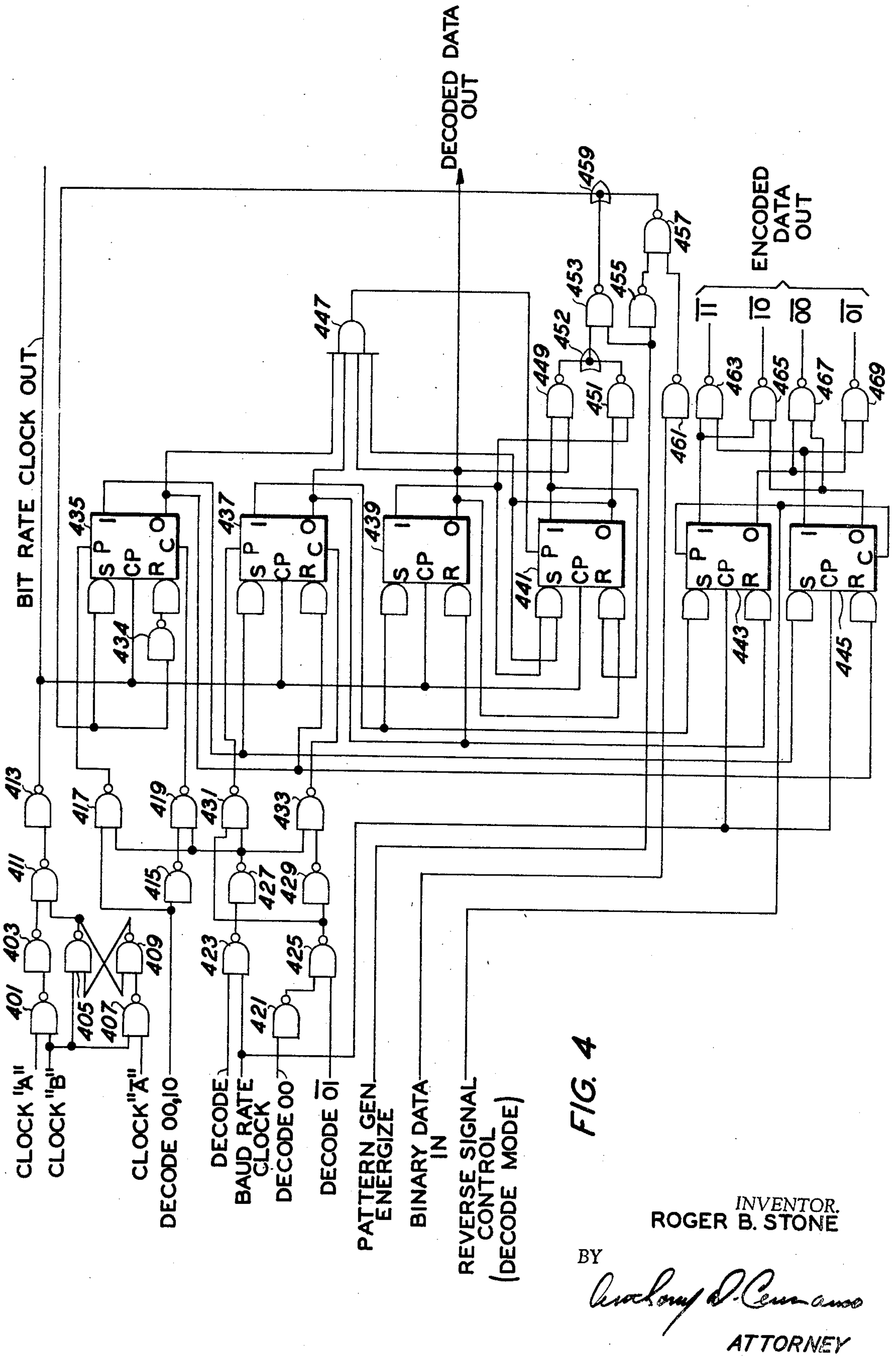
FIG. 4 is the logic diagram of the encoder-decoder circuitry incorporating the pseudo-random pattern generator circuitry in a transceiver unit according to the principles of the present invention.

In FIG. 4 is shown the representative logic diagram for the encoder-decoder circuit with an internal pseudorandom pattern generator. Gates 401, 403, 405, 407, 409, 411 and 413 work together to form a pulse on the rising edge of the clock B pulse, a 2400 c.p.s. clock, as follows. Clock A pulses are clock pulses operating at 230.4 kc. from which the clock B pulses are derived by successive division. Gates 405 and 409 are cross coupled to form a flip-flop which is held in the set position with respect to the output terminal of gate 405 whenever clock B pulses are low. When the clock B pulses go high one pulse from the train formed by the coincidence of clock B pulses and clock A pulses is allowed to pass through gate 411. Then the flip-flop comprising gates 405 and 409 is then reset by the wave formed by the coincidence of the clock B and clock A pulses, which turns off gate 411, thus blocking the passage of further pulses at the coincidence of the clock A and clock B pulses. When the clock B pulse goes low again, the flip-flop becomes set again to await the next pulse from the coincidence of clock A and B pulses which will not occur until the clock B pulse goes high again and the process repeats. The resultant pulses at the output of gate 413, termed the "Bit Rate Clock Out," are then used to shift the shift register formed by flip-flops 435, 437, 439, and 441. The direction of shift is from flip-flop 435 towards flip-flop 441.

The pulse termed "Baud Rate Clock" occurs on every other trailing edge of the clock B pulses and is fromed by combining clock $\overline{A}$ and another 1200 c.p.s. clock derived by dividing clock B in a fashion to that used in forming the "Bit Rate Clock."

For the encoding operation binary data is entered on the line termed "Binary Data In," and passed through gates 461 and 457. The "implicit or" function 459 which is shown connecting the output of gates 453 and 457 will follow only the output of gate 457 when the line termed "Pattern Generator Energize" is low since the pulse on this line holds the output of gate 453 high. Since, however, the output of gate 455 goes high when the "Pattern Generator Energize" signal goes low, gate 457 allows passage of data from gate 455 in this condition. The data passing through gate 457 is then entered into the shift register by coupling directly into the set side of flip-flop 435 and by coupling into the reset side through the inverter formed by gate 434.

After two data bits have been shifted into the shift register by the "Bit Rate Clock" the contents of flip-flops 435 and 437 are transferred by the "Baud Rate Clock" to flip-flop 443 and flip-flop 455 respectively. The flip-flop 443 and 445 are decoded by the gating system as follows:

Gate 463 is low, if any only if flip-flop 443 is set and flip-flop 445 is set.

Gate 465 is low, if and only if flip-flop 443 is set and flip-flop 445 is reset.

Gate 467 is low, if and only if flip-flop 443 is reset and flip-flop 445 is reset.

Gate 469 is low, if and only if flip-flop 443 is reset and flip-flop 445 is set.

These outputs are used to control a four-level discrete modulator of any known design where one of four transmission symbols is selected by whichever of the four gates outputs is low.

In the decoding mode the level termed "Decode" will be high which will allow pulses from the "Baud Rate Clock" to sample the output of the slicers in the demodulator and enter these results into flip-flops 435 and 437. The slicer outputs are the lines labeled "Decode 00, 10," "Decode 00," and "Decode $\overline{01}$," which means that the data received are di-bit combinations 00, or 10 in the first case, di-bit combination 00 in the second case, and is not 01 in the third case if that line is high. "Decode 00, 10" indicates that the low order (righthand) bit is a 0 and thus, it is sampled directly by the "Baud Rate Clock" in gate 417 and is inverted by gate 415 and sampled in gate 419 to set or clear flip-flop 435. "Decode 00" and "Decode $\overline{01}$" are combined by gates 421 and 425 to obtain a level which is high when the high order (left hand) bit is a 0. This is sampled directly by gate 431 and inverted by gate 429, and sampled by gate 433 to place the appropriate bit in flip-flop 437. The two bits entered are then shifted to the output terminal termed "Decoded Data Out" through flip-flop 439.

As hereinbefore stated, it is sometimes desired to have the encoder ignore the data coming in on the "Binary Data In" line and to generate a separate test pattern which can then be encoded in the same manner as data. If the line termed "Pattern Generator Energize" is high, the incoming data will be blocked by gate 457 and the pattern passing through gate 453 will be entered into the shift register. The pattern generator comprising flip-flops 435, 437, 439 and 441 together with gates 449 and 451 in an exclusive-OR function is one of a large general class known as pseudo-random pattern generators.

If the proper two shift register outputs (in this case the last and the next to last) are combined in the exclusive-OR circuit comprising gates 449 and 451 and the result re-entered at the beginning of the shift register, a pattern which repeats after $2^N-1$ bits, where N is the number of shift register stages, will result and the pattern will contain every possible combination of N bits except all binary zeros. Such a combination is desirable in order to obtain the familiar eye pattern as seen in FIG. 2. If the shift register should contain all zeros, the pattern generator would not start since the addition of two zeros in the last two places would result in entering another zero into the shift register and a continuous train of zeros would result. Gate 447 was added to detect this condition and to set a binary one into flip-flop 441 which would put the generator into such a state from which point the pattern generation would continue.

In the foregoing, there has been disclosed apparatus for efficiently encoding and decoding binary to multi-level data information. As hereinbefore stated, the invention may be extended, however, to include the encoding and decoding of any level information signals for application to any of the known modulating circuits, as amplitude or phase modulation, for example. The circuitry was described in conjunction with a discrete signal output for each encoded level for application to a modulator by individual lines. As hereinbefore stated, the invention may include a continuous type output where the transmitted information is a function of the voltage representative of the encoded information. In addition, the encoding and decoding functions could be reversed, as where a multi-level signal is to be transmitted by binary signals for reconversion to a multi-level signal at the receiving location. Thus, while the present invention, as to its objects and advantages, as described herein, has been set forth in specific embodiments thereof, they are to be understood as illustrative only and not limiting.

What is claimed is:

1. In a communication system wherein information is transmitted by a plurality of multi-level signals, a circuit operable in three distinct modes (transmit, receive, testing), comprising means for converting binary information into multi-level data signals while operating in the transmit mode, means for converting multi-level data information into binary signals while operating in the receive mode, and means for generating pseudo-random test pattern signals while operating in the testing mode.

2. In a frequency shift communication system wherein binary information is transmitted by a plurality of discrete frequency signals, the combination comprising first shift register means for serially storing said binary information into successive groups of data bits, second shift register means coupled to said first shift register means for simultaneously storing in parallel the data bits in said first register means, first gating means coupled to said second shift register means for generating discrete signals for each of said binary digit group combinations in the transmit mode, second gating means for generating enabling signals from input discrete signals for application to said first shift register means in the receive mode, third shift register means coupled to said first shift register means to form a fourth shift register means comprising said second and third shift register means, third gating means coupled to said fourth shift register means in an exclusive-OR function, and fourth gating means for enabling said fourth shift register means and said third gating means as a pseudo-random pattern generator in the testing mode.

3. The combination as set forth in claim 2 wherein said pattern generators generates a test pattern which repeats after $2^N-1$ clock pulses, where N is the number of stages in said fourth shift register means.

References Cited

UNITED STATES PATENTS

| | | | |
|---|---|---|---|
| 3,121,197 | 2/1964 | Irland | 325—320 |
| 3,128,342 | 4/1964 | Baker | 178—67 |
| 3,337,864 | 8/1967 | Lender | 325—38 |
| 3,343,125 | 9/1967 | Lender | 325—41 |
| 3,348,149 | 10/1967 | Crafts et al. | 178—66 |
| 3,369,229 | 2/1968 | Dorros | 325—38 |
| 3,371,279 | 2/1968 | Lender | 325—320 |
| 3,392,238 | 7/1968 | Lender | 178—67 |
| 3,427,444 | 2/1969 | Tang | 325—42 |

KATHLEEN CLAFFY, Primary Examiner

A. B. KIMBALL, Jr., Assistant Examiner

U.S. Cl. X.R.

17—68; 325—21, 30, 38, 42, 163, 320